Jan. 16, 1945.　　　　S. M. UDALE　　　　2,367,543
LIQUID METER
Filed April 19, 1943
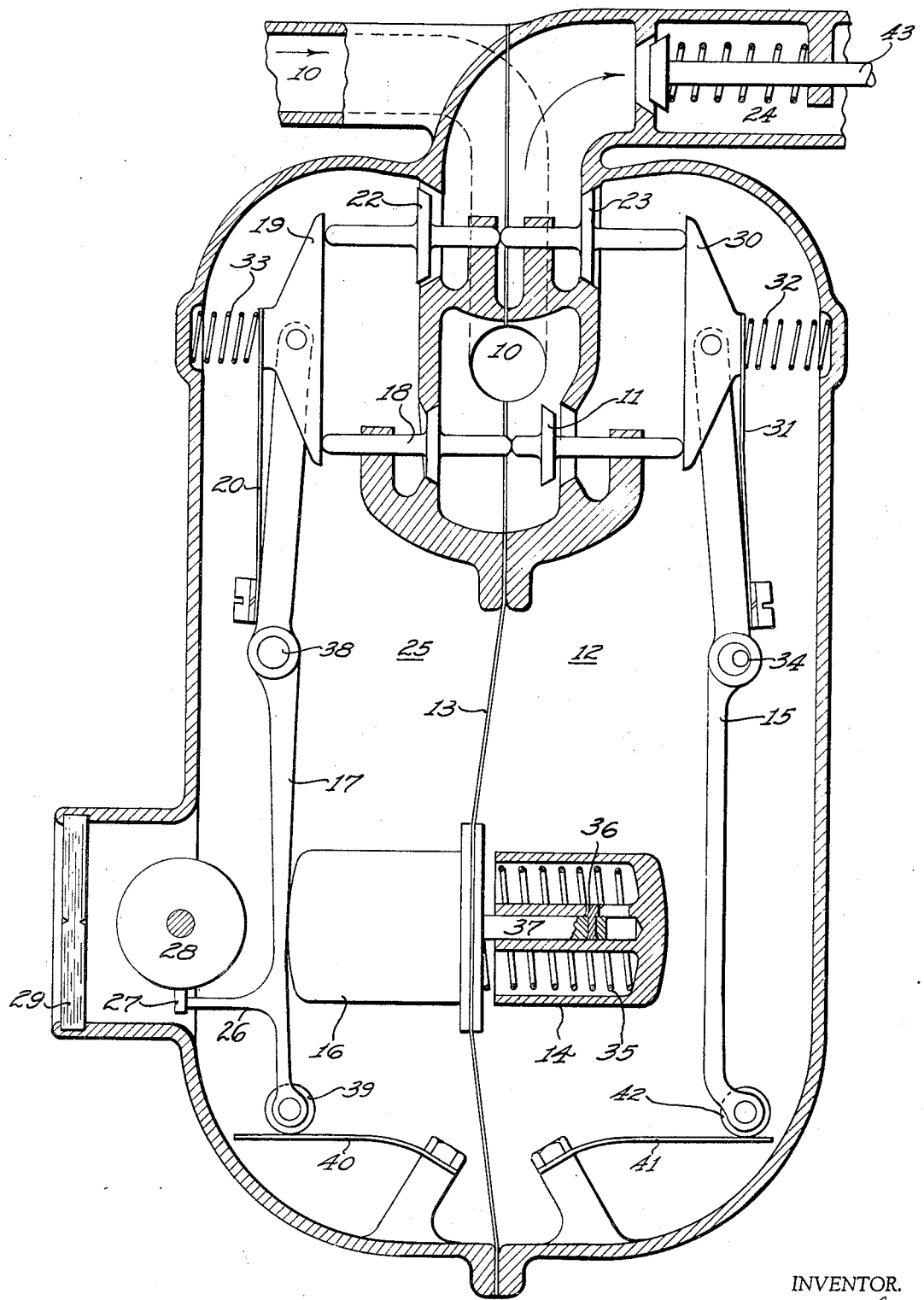
INVENTOR.
Stanley M. Udale Patented Jan. 16, 1945

2,367,543

UNITED STATES PATENT OFFICE 2,367,543

LIQUID METER

Stanley M. Udale, Detroit, Mich., assignor to George M. Holley and Earl Holley

Application April 19, 1943, Serial No. 483,587

4 Claims. (Cl. 73—270)

The object of this invention is to indicate the quantity of a liquid under pressure that flows through a pipe between the successive readings of a displacement meter.

The drawing shows the principal details of my invention being a cross sectional elevation taken through the center.

In the drawing, 10 is the entrance of the liquid under pressure. 11 is one of the entrance valves which is shown in the open position. 12 is one of two chambers located on opposite sides of the flexible diaphragm 13. 14 is one of the two spring supported engaging caps carried by the diaphragm 13. 15 is one of two oscillating levers which will engage with the cap 14 when the diaphragm 13 is moved over to the right. The position of the diaphragm as shown, is the position in which the other spring supported engaging cap 16 carried by the diaphragm 13 engages with 17 which is the other of the two levers 15 and 17. This lever 17 is shown engaging with a valve 18 which is the other of the two inlet valves and is in alignment with the valve 11. Engagement between the lever 17 and valve 18 is made through a rocking lever 19, pivotally supported on the end of lever 17. A flat spring 20 normally maintains the rocking lever 19 in a position roughly in line with lever 17. One end of the rocking lever 17 engages with the valve 18 and unseats it and at the same time seats the valve 11 as the two valves 18 and 11 touch each other. Immediately thereafter, the exit valve 22 is seated and the other exit valve 23 is opened. When valves 18 and 23 are unseated, the pressure on the two sides of these valves is suddenly equalized. The liquid under pressure in chamber 12 then escapes through the passage 24 and the chamber 12 then becomes the chamber from which the liquid flows to the outlet 24. Valves 11, 18, 22, and 23 are adapted to close in the direction of flow. Attention is called to the fact that the outlet valves 22 and 23 are of larger diameter than the inlet valves 11 and 18.

Meanwhile, chamber 25 located to the left of diaphragm 13 receives liquid under pressure from the liquid entrance 10 past the valve 18 and the diaphragm 13 is moved to the right. Meanwhile, lever 17 through pin 26 has engaged with a finger 27 causing a counter 28 to operate. A window 29 permits this counter 28 to be read, two lines on the window 29, front and back, are provided so that the counter can only be read when the eye is on a plane with the center of the counter and the two lines. As the diaphragm 13 travels to the right, eventually, the cap 14 engages with lever 15 which causes a pivotally supported rocking lever 30 to engage with the inlet valve 11 to unseat the inlet valve 11 and to reseat the outlet valve 23. A flat spring 31 maintains normally the locking lever 30 roughly in alignment with lever 15. Two light supporting springs 32 and 33 are provided to keep the rocking levers 19 and 30 at all times in engagement with the valves 18, 22, 23, and 11.

In order to adjust the meter so that the displacement of liquid may for example, be exactly $\frac{1}{10}$ of a gallon, an eccentric supporting pin 34 is provided for lever 15 so that the position of the lever 15 at which it engages with cap 14 can be adjusted so as to calibrate the meter. Once the pin 34 has been located so that each movement of counter 28 corresponds to $\frac{1}{10}$ of a gallon, the pin 34 is sealed and thereafter the meter can be easily read by merely dividing the reading by 10.

The springs 36 inside the caps 14 and 16 are designed so that they are not strong enough to unseat the valves against the pressure difference between the entering fluid and the fluid as it leaves the meter.

In order to make the action of the mechanism more positive, a roller 39 is mounted on an extension of the lever 17 and in the position shown which is just before the lever 17 is rotated clockwise, the roller 39 is shown engaging with a spring 40 so that the turning moment about the pivot 38 of the lever 17 is counter-clockwise. At the same time, a spring 41 engages with roller 42 mounted on lower end of lever 15 and the turning moment of the force imposed by spring 41 on the pivot 34 is counterclockwise. This counter-clockwise turning moment imposes a seating pressure on the valves 18 and 23. The spring 40 is adapted to cause a turning moment to impose a sealing pressure on valves 11 and 22 when these valves are closed. A lightly loaded valve 43 which has the function of a non-return valve, may be mounted in the outlet 24 to prevent back flow if the pump which provides liquid under pressure through the pipe 10 has an intermittent flow so that the fuel enters the device in pulsations. In that event, there is a possibility of back flow which would interfere with calibration of the device.

The counter 28 may be a cylinder having a single set of numbers thereon or may be composed of a plurality of numeral wheels. Any commercial counter that can be purchased may be used. The design of this counter is no part of this invention.

*Operation*

When valve 18 is opened, the pressure thus admitted to the chamber 25 is immediately exerted on the valve 22 which is immediately closed and the valve 23 is opened. The closing of the valve 22 and the opening of the valve 23 is accelerated by the action of the springs 33, 20, and 40. The springs 32, 31, and 41 are not in a position to oppose the closure of valve 22 and the opening of valve 23. Subsequently, the diaphragm 13 reverses as described in the specification.

What I claim is:

1. In a liquid meter for a liquid under pressure, a chamber, a flexible diaphragm therein dividing said chamber into two parts, an inlet valve in each chamber part, an outlet valve located in each chamber part both sets of valves being adapted to be seated in the direction of flow of the liquid, means for alternately opening the inlet valve and closing the outlet valve in one chamber part while the inlet valve is being closed and the outlet valve is being opened in the other chamber part comprising two spring supported caps mounted on each side and in the center of said diaphragm, two levers pivotedly mounted one in each chamber part and one end of each lever being adapted to engage with one of the two spring supported caps, when the diaphragm is displaced to one of its two extreme positions, the other end of each lever being adapted to engage with one of the inlet and with one of the outlet valves, the two inlet valves being arranged in line so that when one is unseated the other valve is seated, the outlet valves being arranged in line so that when one is unseated the other is seated, said levers being so arranged in said chamber that after the diaphragm has travelled, a predetermined distance from its neutral position towards the outer wall of one of said chamber parts the spring supported cap located in said chamber part and mounted on said diaphragm engages with the lever located in said chamber part and said lever engages with and closes the open outlet valve of said chamber part and engages with and opens the closed inlet valve of said chamber part and simultaneously opens the closed outlet valve of said other chamber part and closes the open inlet valve of said other chamber part, the two valves which are thus closed being held closed by the pressure thereon of the liquid under pressure, means controlled by said diaphragm for counting the number of cycles of operation.

2. In a device as set forth in claim 1 in which one of the levers is mounted on an eccentric pivot whereby the quantity of liquid displaced per cycle can be adjusted by rotating the eccentric pivot.

3. In a liquid meter for a liquid under pressure, a chamber, a movable wall therein dividing said chamber into two parts, an inlet valve in each chamber part, an outlet valve located in each chamber part, both sets of valves being adapted to be seated in the direction of flow of the liquid, means for alternately opening the inlet valve and closing the outlet valve in one chamber part while the inlet valve is being closed and the outlet valve is being opened in the other chamber part comprising two levers pivotally mounted one in each chamber part, one end of each lever being adapted to engage with said moving wall when said moving wall is displaced to one of its two extreme positions, the other end of each lever being adapted to engage with both the inlet and outlet valves of one chamber part when the said moving wall is displaced to one of its two extreme positions, the two inlet valves being arranged in line and the two outlet valves being also arranged in line so that when one valve is unseated, the other valve is seated whereby the liquid under pressure causes the movable wall to move back and forth as the liquid flows through said meter, two spring-loaded caps located one on each side of said moving wall at the point where the said moving wall engages with said levers, a counter adapted to be operated by the movement of said movable wall.

4. In a liquid meter for a liquid under pressure, a chamber, a movable wall therein dividing said chamber into two parts, an inlet valve in each chamber part, an outlet valve located in each chamber part, both sets of valves being adapted to be seated in the direction of flow of the liquid, means for alternately opening the inlet valve and closing the outlet valve in one chamber part while the inlet valve is being closed and the outlet valve is being opened in the other chamber part comprising two levers pivotally mounted one in each chamber part, one end of each lever being adapted to engage with said moving wall when said moving wall is displaced to one of its two extreme positions, the other end of each lever being adapted to engage with both the inlet and outlet valves in one chamber part when the said moving wall is displaced to one of its two extreme positions, the two inlet valves being arranged in line and the two outlet valves being also arranged in line so that when one valve is unseated, the other valve is seated whereby the liquid under pressure causes the movable wall to move back and forth as the liquid flows through said meter, each said levers including a spring loaded rocking lever pivotally mounted one at the end of each of the said levers, said rocking levers adapted to engage with said valves whereby after one pair of valves has been displaced by said moving wall, force is applied to displace the other pair of valves in addition to that of said moving wall, a counter adapted to be operated by the movement of said movable wall.

STANLEY M. UDALE.